US012010999B2

(12) United States Patent
Lin et al.

(10) Patent No.: US 12,010,999 B2
(45) **Date of Patent: *Jun. 18, 2024**

(54) **APPLICATION OF ENDOPHYTIC *FALCIPHORA ORYZAE* FO-R20 IN CONTROLLING PANICLE BLAST**

(71) Applicant: ZHEJIANG ACADEMY OF AGRICULTURAL SCIENCES, Hangzhou (CN)

(72) Inventors: Fucheng Lin, Hangzhou (CN); Zhenzhu Su, Hangzhou (CN); Lin Li, Hangzhou (CN); Yan Liang, Hangzhou (CN); Kunlun Shen, Hangzhou (CN)

(73) Assignee: ZHEJIANG ACADEMY OF AGRICULTURAL SCIENCES, Hangzhou (CN)

( * ) Notice: Subject to any disclaimer, the term of this patent is extended or adjusted under 35 U.S.C. 154(b) by 88 days.

This patent is subject to a terminal disclaimer.

(21) Appl. No.: 17/833,019

(22) Filed: Jun. 6, 2022

(65) Prior Publication Data

US 2022/0386625 A1 Dec. 8, 2022

(30) Foreign Application Priority Data

Jun. 7, 2021 (CN) ......................... 202110631866.2

(51) Int. Cl.
*A01N 63/30* (2020.01)
*A01P 3/00* (2006.01)
*C12N 1/14* (2006.01)

(52) U.S. Cl.
CPC ................ *A01N 63/30* (2020.01); *A01P 3/00* (2021.08)

(58) Field of Classification Search
CPC .............. A01N 63/30; A01P 3/00; C12N 1/14
See application file for complete search history.

(56) References Cited

FOREIGN PATENT DOCUMENTS

CN 109769535 5/2019

OTHER PUBLICATIONS

Zhenzhu et al. (CN 109769535), May 21, 2019, (translation of document submitted by the applicant).*

* cited by examiner

*Primary Examiner* — Zohreh A Fay
(74) *Attorney, Agent, or Firm* — Jiwen Chen; Joywin IP Law PLLC

(57) ABSTRACT

The present invention discloses an application of an endophytic fungi FO-R20 in prevention and treatment of rice neck or panicle blast, and belongs to the technical filed of microbial applications. The *Falciphora oryzae* FO-R20 with a deposit number of CCTCC M 2021505 is prepared into a seed coating agent or solid fungal fertilizer and applied to rice seeds; and in the culture process, the strain is colonized at the roots of rice, thus the disease resistance of rice to neck or panicle blast is remarkably enhanced, the prevention and treatment efficiency reaches 86.91%-90.85%, and the disease index is reduced by 64.92-72.07. The biological prevention and treatment effect of the endophytic fungi *Falciphora oryzae* FO-R20 against rice neck or panicle blast has great value by promotion and applications thereof in the field of agriculture.

7 Claims, 2 Drawing Sheets

Specification includes a Sequence Listing.

APPLICATION OF ENDOPHYTIC *FALCIPHORA ORYZAE* FO-R20 IN CONTROLLING PANICLE BLAST

This application claims priority to Chinese Patent Application No. 2021106318662 filed Jun. 7, 2021, which is hereby incorporated by reference.

FIELD OF TECHNOLOGY

The present invention relates to the technical field of microbial applications, and particularly relates to an application of *Falciphora oryzae* FO-R20 in prevention and treatment of rice neck or panicle blast.

BACKGROUND TECHNOLOGY

Rice blast, also known as rice fever, is an important disease of rice worldwide and is ranked as one of the three major diseases of rice along with sheath blight and bacterial blight. Rice blast is an epidemic transmitted on air currents, posing a great threat to rice production. While the degree of damage varies depending on the cultivars, culture techniques and climatic conditions, a yield reduction of 10%-20% is generally seen, with crop failures in local fields. Rice blast may occur throughout the growth duration of rice. It can be divided into seedling blast, leaf blast, collar blast, node blast, neck or panicle blast, branch blast and grain blast depending on the growth stage and the part of the plant that is affected, among which neck or panicle blast has the greatest impact on yield.

Currently the most cost-effective way for the prevention of the disease is cultivation of a rice cultivar with disease resistance. However, the disease resistance may be lost due to mutation or adaptation of races of the pathogens during long cultivation of a rice cultivar with a single resistance gene, resulting in a recurrence of the disease. Besides, rice blast is generally prevented and treated with chemical fungicides as well. However, prolonged overuse of chemical fungicides not only increases the production cost of rice, but causes safety problems in rice quality and pollution of ecological environment. Therefore, it has become a hot study topic in disease control in plants to search for efficient, environment friendly, green and safe biological prevention and treatment measures.

Biological prevention and treatment is a method of reducing the number of pathogens or the pathogenicity thereof using various adverse effects of beneficial microorganisms on pathogens (such as anti-bacteria effect, bacteriolytic effect, competition, mycoparasitism); meanwhile, the beneficial microorganisms for biological prevention and treatment may also induce an enhanced disease resistance of plants, enhance the immunity of plants, and delay, relieve or inhibit the induction of diseases.

There are a lot of beneficial microorganisms hiding in the ecological system of the nature, among which are the endophytic fungi in plants. The endophytic fungi in plants refer to a group of fungi which can invade and colonize healthy plant tissues during at least a part of the life cycle thereof without causing apparent disease symptoms in the host. Commonly existing in ecological systems, the endophytic fungi have very stable long-term interactions with the host plants. During the formation of the mutualism between the endophytic fungi in plants and the hosts, on one hand, the endophytic fungi in plants obtain water and mineral nutrients among other nutrients required for growth from the host, while on the other hand, the endophytic fungi in plants also provide the plants with various biological functions, such as promoting the growth of plants, improving the biomass of plants, and enhancing the resistance of host plants against biotic and abiotic stresses.

The invention patent under the application number CN201910044093.0 disclosed an application of a fungal strain *Phialophora oryzae* with a deposit number of CGMCC No. 2737 in prevention and treatment of rice bacterial blight. However, there is no report yet so far of functions of endophytic fungal strains in wild rice in prevention and treatment of rice neck blast.

SUMMARY OF THE INVENTION

An object of the present invention is to provide an endophytic fungi capable of improving resistance of rice to neck or panicle blast, wherein the endophytic fungi is used in prevention and treatment of rice neck or panicle blast.

To achieve the above object, the following technical solution is adopted herein.

In the present invention, a new endophytic fungi of Phialophora was isolated and obtained from the root system of oryza meyeriana in Yunnan, the strain was identified as belonging to the genus Phialophora in the family Magnaporthaceae in the class Sordariomycetes in the phylum Ascomycota in the kingdom Fungi, and was designated with the scientific name *Falciphora oryzae* FO-R20. The strain was deposited on May 8, 2021 in the China Center for Type Culture Collection (CCTCC) at Wuhan University in Wuhan, China, the recognized IDA under the Budapest Treaty on the International Recognition of the Deposit of Microorganisms for the Purposes of Patent Procedure, under the deposit number of CCTCC M 2021505, and the scientific name thereof is *Falciphora oryzae*.

It is demonstrated by the study of the present invention that after colonization of the endophytic fungal *Falciphora oryzae* FO-R20 in the root tissue of rice, the resistance of rice to neck or panicle blast could be obviously improved, and the prevention and treatment efficiency was up to 90.85%.

Therefore, the present invention provides the application of the endophytic fungi *Falciphora oryzae* FO-R20 with the deposit number of CCTCC M 2021505 in prevention and treatment of rice neck or panicle blast.

The application is that the endophytic fungi *Falciphora oryzae* FO-R20 is co-cultured with rice and is colonized at the root tissue of rice.

Further, the application comprises the steps of: uniformly mixing endophytic fungi *Falciphora oryzae* FO-R20 mycelia and a chitosan solution to prepare a seed coating agent, then mixing the seed coating agent with rice seeds and placing the seeds at a cool and ventilated place for air drying to obtain coated seeds, and then sowing the coated seeds directly in a field via direct seeding and performing culturing until harvest.

Due to the advantages of small dosage of the seed coating agent, convenience in use and convenience in popularization, the endophytic fungi *Falcophora oryzae* FO-R20 is applied to rice seeds in a form of the seed coating agent, which remarkably improves the colonization effect; and the coated seeds are applied to a field in a direct seeding manner, the operation is simple and convenient.

Further, the activated endophytic fungal *Falciphora oryzae* FO-R20 is inoculated in a liquid fermentation medium and cultured at 25° C. to obtain mycelia, then the mycelia are mixed with the chitosan solution at a mass percentage concentration of 1% in a ratio of 1 g:10 L to obtain the seed coating agent; and 1% of chitosan solution is prepared by dissolving 1 g of chitosan in 100 mL of 1% acetic acid solution based on the dry weight of the mass of mycelia.

The liquid fermentation medium contains 0.4% of soybean cake flour, 1% of corn flour, 0.05% of magnesium sulfate and 0.1% of dipotassium phosphate per 250 mL of the medium by mass percentage.

Before liquid fermentation, the endophytic fungal *Falciphora oryzae* FO-R20 is inoculated in a PDA medium for activated culture and is cultured in dark for 7 days at 25° C.

Further, the application comprises the steps of: inoculating the endophytic fungal *Falciphora oryzae* FO-R20 to sterile barley grains, performing culturing in dark until mycelia grow and the grains are covered with mycelia to obtain an FO-R20 solid fungal fertilizer, and then mixing the FO-R20 solid fungal fertilizer with a seedling substrate to obtain a mixed substrate, and sowing germinated rice seeds in the mixed substrate for seedling raising, and then transplanting rice seedlings into a field and performing culturing until harvest.

In the present invention, *Falciphora oryzae* FO-R20 is prepared into the solid fungal fertilizer, and the solid fungal fertilizer is applied to the root of rice in a foam of substrate seedling raising, thus *Falciphora oryzae* FO-R20 is colonized at the root of rice.

Further, the activated endophytic fungal *Falciphora oryzae* FO-R20 is inoculated in the liquid fermentation medium and cultured at 25° C. to obtain fermentation broth, the fermentation broth is mixed with the sterile barely grains in a ratio of 100 mL:500 g, and the mixture is cultured in dark at 25° C. until mycelia grow and the grains are covered with mycelia, thus obtaining the FO-R20 solid fungal fertilizer;

the liquid fermentation medium contains 0.4% of soybean cake flour, 1% of corn flour, 0.05% of magnesium sulfate and 0.1% of dipotassium phosphate per 250 mL of the medium by mass percentage.

Further, when preparing the mixed substrate, the solid fungal fertilizer and the seedling substrate are mixed in a mass ratio of 1:9.

The beneficial effects of the present invention are as follows.

The *Falciphora oryzae* FO-R20 is prepared into the seed coating agent or solid fungal fertilizer and applied to rice seeds; and in the culture process, the strain is colonized at the root of rice, thus the disease resistance of rice to neck or panicle blast was remarkably enhanced, the prevention and treatment efficiency reaches 86.91%-90.85%, and the disease index was reduced by 64.92-72.07. The biological prevention and treatment effect of the endophytic fungi *Falciphora oryzae* FO-R20 against rice neck or panicle blast has great value by promotion and applications thereof in the field of agriculture.

DESCRIPTION OF THE EMBODIMENTS

Figure 1:
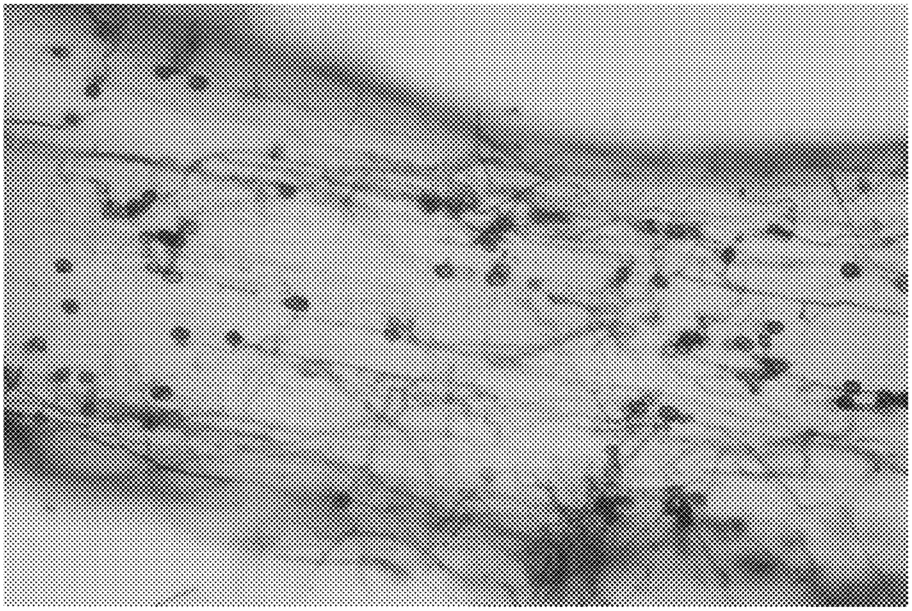
FIG. 1 shows colonization of an endophytic fungi FO-R20 in root of rice.

The present invention is further described hereinafter in combination with detailed examples, but the present invention is not limited hereto. Unless otherwise specified, the technical means adopted in the examples are all regular technical means in the field, and the reagents are all commercially available.

Example 1 Isolation and Identification of Endophytic Fungal FO-R20

I. Isolation and Purification of Endophytic Fungi FO-R20

The endophytic fungi FO-R20 was isolated from the root system of oryza meyeriana (collected from Xishuangbanna, Yunnan Province, China). The detailed method of isolation was as follows: firstly, the root system of the wide rice was continuously rinsed with tap water and the soil particles and appendages were removed carefully. Healthy root tissues were picked for surface sterilization, and were immersed in 75% ethanol for 1-2 min and 1% sodium hypochlorite for 4-5 min, and subsequently rinsed with sterile deionized water three times. The root tissues were cut into 0.5 cm long segments, which were then transferred into 2% malt extract agar (MEA, malt extract agar, OXOID; with 50 mg/L of chloramphenicol added to the medium to inhibit the growth of endophytic fungi) plates for incubation at 25° C. in the dark. Endopytic fungal mycelia emerged from the edge of the tissue cuts on the fifth day of incubation, and were carefully picked with an inoculation loop and transferred into a fresh PDA medium for purification and cultivation. The strain was recorded as FO-R20.

The PDA medium contained 20 g/L of dextrose, 200 g/L of potatoes and 15 g/L of agar. The potatoes (200 g/L) were weighed according to the volume of the medium to be prepared, and were boiled, mashed, dissolved and filtered, then added with dextrose and agar, and autoclaved at 121° C. for 20 min.

II. Identification of Strain

1. Morphological Identification

The isolated and purified strain FO-R20 was inoculated on a PDA medium and cultured at 25° C. for 7 days. A small amount of the fungal mass was picked with an inoculation loop to prepare a slide for observation, and measurement under an optical microscope. The morphological characteristics thereof are that, the colony of strain FO-R20 grew slowly on the PDA plate and the colony diameter reached 6 cm after growing on the PDA plate at 25° C. for 10 days; aerial mycelia were poorly developed, prostrating on the medium surface, and the colony was brown, the mycelia were hyaline or dark brown, 1.0-2.5 μm in width; conidiophores were bottle-shaped, solitary, unbranched, 5.0-13.5×2.5-3.0 μm; conidia were sickle-shaped, colorless, no septum, 7.0-9.0×0.8-1.2 μm.

2. Molecular Identification (1) DNA Extraction

① After the culture of FO-R20 on the PDA plate at 25° C. for 7 days, the mycelia were collected from the plate with a tooth pick and transferred into a sterilized 1.5 mL centrifuge tube containing 300 μL extraction buffer (1 M KCl, 100 mM Tris-HCl, 10 mM EDTA, pH=8.0).

② The fungal mass was pulverized with an electric grinder and vigorously vortexed for 2 min.

③ The mass was centrifuged at 10,000 rpm for 10 min.

④ The supernatant was pipetted to a second clean centrifuge tube, and the precipitate was discarded.

⑤ Isopropanol (AR) was added to the supernatant in an equal volume, and mixed by inverting the tube gently several times, then centrifuged at 12,000 rpm for 10 min to precipitate the nucleic acid.

⑥ The supernatant was discarded gently, and the centrifuge tube containing the precipitate was put on an absorbent paper upside down to drain water.

⑦ Subsequently, 300 μL of 70% ethanol was added and mixed with the precipitate by inverting the tube gently several times and then centrifuged at 12,000 rpm for 2 min.

⑧ The supernatant was discarded gently, and step ⑦ was repeated once.

⑨ The centrifuge tube was placed on an absorbent paper upside down to drain water, and placed at 37° C. for 15 min such that ethanol was fully evaporated.

⑩ The precipitate was resuspended in 50 μL of $ddH_2O$ to obtain the genomic DNA of FO-R20 with a concentration up to 30 ng/μL.

(2) PCR Amplification of Fungal ITS rDNA Gene

The PCR amplification was performed in a 50 μL reaction system containing: 2 μM each of an upstream primer and a downstream primer, 200 μM of dNTPs, 1.5 mM of $MgCl_2$, 5 μL of 10×PCR buffer, 2 μL of template DNA, and 2 U of Taq enzyme.

The sequence of the upstream primer ITS1 was 5'-TCCGTAGGTGAACCTGCGG-3' (SEQ ID NO: 2), and The sequence of the downstream primer ITS4 was 5'-TCCTCCGCTTATTGATATGC-3' (SEQ ID NO: 3).

The PCR amplification reaction was carried out with a Longgene MG96G PCR cycler. The PCR cycling conditions consisted of: pre-denaturation at 94° C. for 2 min; then 35 cycles of denaturation at 94° C. for 30 sec, annealing at 55° C. for 40 sec and extension at 72° C. for 1 min; and a final extension at 72° C. for 10 min.

(3) Recovery and Purification of PCR Products

After the completion of the PCR reactions, the PCR products were checked by electrophoresis in 1% agarose gel, and then recovered and purified with the DNA gel purification kit of Axygen Biotechnology Limited, following the step-by-step procedure provided in the kit instructions.

(4) Gene Sequencing and Sequence Analysis

The purified and recovered target DNA fragment checked by electrophoresis were delivered to Sangon Biotech (Shanghai) for sequencing with an ABIPRISMA377 automatic sequencer. After strict check of the sequencing result, a DNA fragment sequence as shown in SEQ ID No.1 with a length of 527 bp was obtained.

Homologous or similar nucleotide sequences were searched for and aligned to the obtained nucleotide sequence by BLAST in the GenBank database on the national center for biotechnology information (NCBI) website. According to the BLAST alignment, the strain was identified as belonging to the genus Phialophora, with a percentage coverage of 100% and an identity up to 100% between the obtained sequence and the sequence under accession number NR_153972.1.

As demonstrated by the results of the above molecular identification and morphological identification, the newly isolated strain belongs to the genus Phialophora in the family Magnaporthaceae in the class Sordariomycetes in the phylum Ascomycota in the kingdom Fungi. The strain was designated with the scientific name *Falciphora oryzae* FO-R20, and was deposited on May 8, 2021 in the China Center for Type Culture Collection (CCTCC) at Wuhan University in Wuhan, China, the recognized IDA under the Budapest Treaty on the International Recognition of the Deposit of Microorganisms for the Purposes of Patent Procedure, under the deposit number of CCTCC M 2021505.

Example 2 Effect of FO-R20 Coating Agent in Prevention and Treatment of Rice Neck or Panicle Blast Test plant: *Oryza sativa* L., a regular rice cultivar, Zhejing 88.

1. Culture of FO-R20 and Liquid Fermentation

FO-R20 preserved on a filter paper sheet was inoculated on a potato dextrose agar (PDA) solid medium to be activated through culturing at 25° C. for 7 days in the dark. Plugs were punched with a 0.5 cm diameter hole punch, and (5 plugs) were inoculated into an Erlenmeyer flask containing 500 mL of a liquid fermentation medium, and incubated in a shaker (set at 25° C. and at a speed of 150 rpm) for 7 days. Next, the liquid fermentation broth was vacuum filtered to remove the medium and obtain the mycelia. 0.1 g mycelia were weighed, and the moisture content was measured as 80% for calculation of the dry weight of mycelia.

The PDA medium contained 20 g/L of dextrose, 200 g/L of potatoes and 15 g/L of agar. The potatoes (200 g/L) were weighed according to the volume of the medium to be prepared, and were boiled, mashed, dissolved and filtered, then added with dextrose and agar, and autoclaved at 121° C. for 20 min.

The liquid fermentation medium was prepared with 0.4% of soybean cake flour, 1% of corn flour, 0.05% of magnesium sulfate and 0.1% of dipotassium phosphate in proportion, and supplemented with water to give 250 mL of the medium; the medium was subjected to moist heat sterilization at 120° C. for 15 min.

2. Preparation of FO-R20 seed coating agent: the seed coating agent was obtained by mixing the mycelia with a 1% chitosan solution in a ratio of 1:10000 (dry weight:volume), that was, mixing 1 g of mycelia by dry weight and 10 L of 1% chitosan solution to obtain the seed coating agent. Since the moisture content of mycelia after vacuum filtration varies, the seed coating agent was prepared each time according to the calculated dry weight of mycelia.

The formulation of the 1% chitosan solution was as follows: dissolving 1 g of chitosan in 100 mL of 1% acetic acid solution.

3. Seed coating treatment: the surface of rice seeds was disinfected with 1% sodium hypochlorite for 10 min, rinsed well with water and drained, and then the disinfected seeds were mixed with the seed coating agent in a ratio of 2.5:1 (weight:volume), i.e., use 1 mL of the seed coating agent for every 2.5 g of seeds to obtain coated seeds. The coated seeds were spread on sterile gauze and placed in a cool and ventilated place (15-28° C.) for air drying for 2-3 days.

4. The coated seeds were uniformly sown in a field by the means of direct and manual seeding, and cultured until harvest with normal water and fertilizer management, and no fungicide was applied during the entire growth duration. The seed dosage was 4 kg per Mu (Mu is a unit of area that is commonly used in China. 1 Mu is about 666.7 m2).

Additionally, to ensure that the fungus could colonize the roots, seedlings were pulled out 15 days after sowing, the root system was cleaned and a small portion of the roots were cut to obtain a sample to be observed under an LSM780 fluorescence confocal microscope (Carl Zeiss Inc., Jena, Germany) for microscopic examination of colonization of the fungus FO-R20 in the roots (FIG. 1).

5. Investigation on Control Efficiency of Neck or Panicle Blast

Investigation was performed from the period of rice growing to rice maturing. Investigation was performed by sampling in five points of a diagonal line of each plot, a total of 2000 ears of rice were investigated, and grades were recorded in units of ears.

The calculation formula of disease index and prevention and treatment efficiency was:

$$\text{Disease index (\%)} = \frac{\sum[\text{Quantity of diseased ears at each grade} \times \text{Relative grade}]}{\text{Total amount of investigated ears} \times 9} \times 100$$

$$\text{Control efficiency (\%)} = \left[1 - \frac{\text{Disease index of treatment group}}{\text{Disease index of control group}}\right] \times 100$$

According to the standard of Fang Zhongda et al. (1990) (Table 1), the diseased ears were classified and counted, and the disease index and prevention and treatment efficiency were calculated.

TABLE 1

Grading standard of rice neck or panicle blast

| Disease grade | Disease severity |
|---|---|
| 0 | No disease |
| 1 | Disease in node or ear of rice, an average loss of 5%; |
| 3 | Disease in node or ear of rice, an average loss of 20%; |
| 5 | Disease in node or ear of rice, an average loss of 50%; |
| 7 | Disease in node or ear of rice, an average loss of 70%; |
| 9 | Disease in node or ear of rice, no harvest; |

Figure 2:
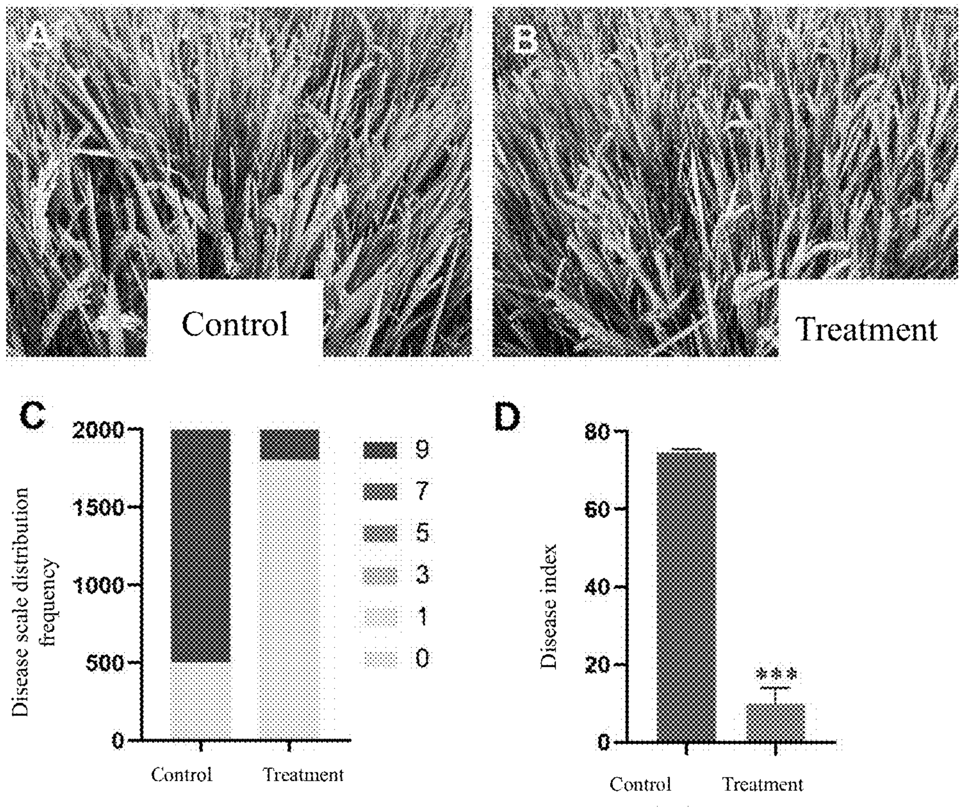
FIG. 2 shows control efficiency of an endophytic fungi FO-R20 seed coating agent against neck or panicle blast in a field in Example 2. A-B demonstrate the disease severity of rice neck or panicle blast in an FO-R20 seed coating agent treatment group and a control group; C shows a disease-scale index frequency distribution of rice neck or panicle blast in the FO-R20 seed coating agent treatment group and the control group; and D demonstrates the disease index of rice in the FO-R20 seed coating agent treatment group and the control group, the data in the figures being mean±SD. Significance level (t-test):***P<0.0001.

Through the investigation on the incidence of rice neck or panicle blast, it was found that: the rice plants in the control group suffered severe neck or panicle blast (FIG. 2A), and the neck or panicle turned brown, resulting in withered white ears or blighted grains. Only 25.3% of the rice plants were not susceptible (FIG. 2C), and 74.7% of the rice plants had a disease grade of 9 with a disease index of 74.7 (FIG. 2D).

In contrast, the rice plants inoculated with FO-R20 in the roots had less disease (FIG. 2B), 90.2% of the rice plants had no disease, and only 9.75% of the rice plants had neck or panicle blast grade of 9 (FIG. 2C), with sporadic white ears or blighted grains, the disease index was only 9.78 (FIG. 2D), and the prevention and treatment efficiency on the rice neck or panicle blast reached 86.91%.

Example 3 Effect of FO-R20 Solid Fungal Fertilizer in Prevention and Treatment of Rice Neck or Panicle Blast Test plant: *Oryza sativa* L., a regular rice cultivar, Zhejing 88.

1. Culture and Fermentation of FO-R20

FO-R20 preserved on a filter paper sheet was inoculated on a potato dextrose agar (PDA) solid medium to be activated through culturing at 25° C. for 7 days in the dark. Plugs were punched with a 0.5 cm diameter hole punch, and (5 plugs) were inoculated into an Erlenmeyer flask containing 500 mL of a liquid fermentation medium, and incubated in a shaker (set at 25° C. and at a speed of 150 rpm) for 7 days. Then the liquid fermentation broth was inoculated in a culture bottle containing sterile wheat grains (500 g wheat grains/bottle, 100 mL fermentation broth: 500 g wheat grains), and incubated in a dark incubator at 25° C. for 10-15 days, until the mycelia grew and the grains were covered with the mycelia, and then set aside.

The PDA medium contained 20 g/L of dextrose, 200 g/L of potatoes and 15 g/L of agar. The potatoes (200 g/L) were weighed according to the volume of the medium to be prepared, and were boiled, mashed, dissolved and filtered, then added with dextrose and agar, and autoclaved at 121° C. for 20 min.

The liquid fermentation medium was prepared with 0.4% of soybean cake flour, 1% of corn flour, 0.05% of magnesium sulfate and 0.1% of dipotassium phosphate in proportion, and supplemented with water to give 250 mL of the medium; the medium was subjected to moist heat sterilization at 120° C. for 15 min.

2. Seedling Raising in Substrate with FO-R20 Solid Fungal Fertilizer

The fermented solid fungal fertilizer were mixed with a regular seedling substrate and spread in a seedling tray, each seedling tray containing 10 g solid fungal fertilizer. The rice seeds were soaked in 3000-time diluted 25% phenamacril for 2 days for seed disinfection, and then placed in a dark constant-temperature incubator set at 30° C. for 1-2 days to facilitate germination. When radicles emerged from the seeds, the seeds were uniformly sown in seedling trays and placed in a seedling field for seedling raising and culturing, where the seeds were subjected to normal water management.

3. Transplanting of Rice Seedlings

After growth in the seedling trays for 23-25 days, the seedlings were pulled out and transplanted into fields. The seedlings were transplanted in such a manner that there were 3 seedlings per cluster, with a distance of 10-15 cm between clusters and 30 cm between rows. The seedlings were cultured until harvest with normal water and fertilizer management, and no fungicide was applied during the entire growth duration.

4. Investigation on Control Efficiency of Neck or Panicle Blast

Investigation was performed from the period of rice growing to rice maturing. Investigation was performed by sampling in five points of a diagonal line of each plot, a total of 600 ears of rice were investigated, and grades were recorded in units of ears. According to Table 1, the diseased ears were classified and counted, and the disease index and prevention and treatment efficiency were calculated.

Figure 3:
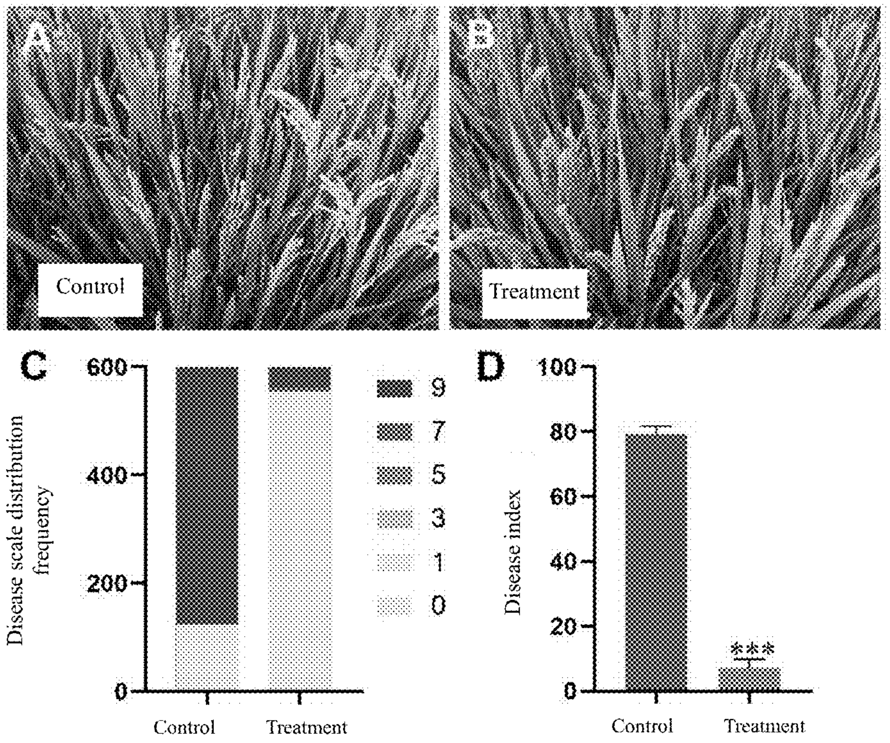
FIG. 3 shows control efficiency of a solid fungal fertilizer of an endophytic fungi FO-R20 against neck or panicle blast in a field in Example 3. A-B demonstrate the disease severity of rice neck or panicle blast in the FO-R20 inoculation treatment group and the control group; C shows a disease-scale index frequency distribution of rice neck or panicle blast in the FO-R20 inoculation treatment group and the control group; and D demonstrates the disease index of rice neck or panicle blast in the FO-R20 inoculation treatment group and the control group, the data in the figures being mean±SD. Significance level (t-test):***P<0.0001.

Through the investigation on the incidence of rice neck or panicle blast, it was found that: the rice plants in the control group suffered severe neck or panicle blast (FIG. 3A), and the neck or panicle turned brown, resulting in withered white ears or blighted grains. Only 20.67% of the rice plants were not susceptible (FIG. 3C), and 79.33% of the rice plants had a disease grade of 9 with a disease index of 79.33 (FIG. 3D).

In contrast, the rice plants inoculated with FO-R20 in the roots had less disease (FIG. 3B), 92.33% of the rice plants had no disease, and only 6.50% of the rice plants had neck or panicle blast grade of 9 (FIG. 3C), with sporadic white ears or blighted grains, the disease index was only 7.26 (FIG. 3D), and the prevention and treatment efficiency on the rice neck or panicle blast reached 90.85%.

The invention claimed is:

1. A method of treatment of rice neck or panicle blast comprising the step of utilizing an endophytic fungi *Falciphora oryzae* FO-R20 with a deposit number of CCTCC M 2021505, wherein the endophytic fungi *Falciphora oryzae* FO-R20 is co-cultured with rice and is colonized at the root tissue of rice.

2. A method of treatment of rice neck or panicle blast comprising the step of utilizing an endophytic fungi *Falciphora oryzae* FO-R20 with a deposit number of CCTCC M 2021505, wherein the method comprises the steps of: uniformly mixing *Falciphora oryzae* FO-R20 mycelia and a chitosan solution to prepare a seed coating agent, then mixing the seed coating agent with rice seeds and placing the seeds at a cool and ventilated place for air drying to obtain coated seeds, and then sowing the coated seeds directly in a field via direct seeding and performing culturing until harvest.

3. The method according to claim 2, wherein the activated endophytic fungal *Falciphora oryzae* FO-R20 is inoculated in a liquid fermentation medium and cultured at 25° C. to obtain mycelia, then the mycelia are mixed with the chitosan solution at a mass percentage concentration of 1% in a ratio of 1 g:10 L to obtain the seed coating agent; and the liquid fermentation medium contains 0.4% of soybean cake flour, 1% of corn flour, 0.05% of magnesium sulfate and 0.1% of dipotassium phosphate per 250 mL of the medium by mass percentage.

4. The method according to claim 3, wherein before liquid fermentation, the endophytic fungal *Falciphora oryzae* FO-R20 is inoculated in a potato dextrose agar (PDA)

medium for activated culture and is cultured in dark for 7 days at 25° C., wherein the PDA medium comprises dextrose, potato and agar.

5. A method of treatment of rice neck or panicle blast comprising the step of utilizing an endophytic fungi *Falciphora oryzae* FO-R20 with a deposit number of CCTCC M 2021505, wherein the method comprises the steps of: inoculating the endophytic fungal *Falciphora oryzae* FO-R20 to sterile barley grains, performing culturing in dark until mycelia grow and the grains are covered with mycelia to obtain an FO-R20 solid fungal fertilizer, and then mixing the FO-R20 solid fungal fertilizer with a seedling substrate to obtain a mixed substrate, and sowing germinated rice seeds in the mixed substrate for seedling raising, and then transplanting rice seedlings into a field and performing culturing until harvest.

6. The method according to claim 5, wherein the activated endophytic fungal *Falciphora oryzae* FO-R20 is inoculated in the liquid fermentation medium and cultured at 25° C. to obtain fermentation broth, the fermentation broth is mixed with the sterile barely grains in a ratio of 100 mL:500 g, and the mixture is cultured in dark at 25° C. until mycelia grow and the grains are covered with mycelia, thus obtaining the FO-R20 solid fungal fertilizer;

the liquid fermentation medium contains 0.4% of soybean cake flour, 1% of corn flour, 0.05% of magnesium sulfate and 0.1% of dipotassium phosphate per 250 mL of the medium by mass percentage.

7. The method according to claim 6, wherein in the step of preparing the mixed substrate, the solid fungal fertilizer and the seedling substrate are mixed in a mass ratio of 1:9.

* * * * *

SEQUENCE LISTING

```
<160> NUMBER OF SEQ ID NOS: 3

<210> SEQ ID NO 1
<211> LENGTH: 527
<212> TYPE: DNA
<213> ORGANISM: Falciphora oryzae

<400> SEQUENCE: 1

cggagggatc attaaagagt tgaaaaactc caacccctgt gaaccttacc tttactgttg     60

cttcggcgga cgacggccct tcgtggcccg aggccgccgg aggttccaaa ctctaaatct    120

ttagtgtatc tctgaggaaa ataaaccaat aattaaaact ttcaacaacg gatctcttgg    180

ttctggcatc gatgaagaac gcagcgaaat gcgataagta atgtgaattg cagaattcag    240

tgaatcatcg aatctttgaa cgcacattgc gcccgccggt attccggcgg gcatgcctgt    300

tcgagcgtca tttcaccact caagcccagc ttggtgttgg ggcacccggc cgcccggcgg    360

tcggggcccc caagtacatc ggcggtctcg ctaggaccct gagcgcagta actcgcggta    420

aaacgcgcct cgctcggaag ttcccagcgg gcttccagcc gctaaacccc ccctaatttt    480

cttaggttga cctcggatca ggtaggaata cccgctgaac ttaagca                  527


<210> SEQ ID NO 2
<211> LENGTH: 19
<212> TYPE: DNA
<213> ORGANISM: Artificial Sequence
<220> FEATURE:
<223> OTHER INFORMATION: Synthesized

<400> SEQUENCE: 2

tccgtaggtg aacctgcgg                                                  19


<210> SEQ ID NO 3
<211> LENGTH: 20
<212> TYPE: DNA
<213> ORGANISM: Artificial Sequence
<220> FEATURE:
<223> OTHER INFORMATION: Synthesized

<400> SEQUENCE: 3

tcctccgctt attgatatgc                                                 20
```